(12) United States Patent
Jung et al.

(10) Patent No.: US 7,839,465 B2
(45) Date of Patent: Nov. 23, 2010

(54) LIQUID CRYSTAL DISPLAY WITH BACKLIGHT UNIT, MOLD FRAME AND COVERLESS BEZEL IN A FRAME SHAPE SURROUNDING AND DIRECTLY CONTACTING OUTER SIDE SURFACE OF MOLD FRAME

(75) Inventors: Younhwan Jung, Yongin-si (KR); Woonbo Yeo, Yongin-si (KR); Wonki Cho, Yongin-si (KR); Jeongmin Park, Yongin-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 282 days.

(21) Appl. No.: 12/051,760

(22) Filed: Mar. 19, 2008

(65) Prior Publication Data

US 2008/0297679 A1 Dec. 4, 2008

(30) Foreign Application Priority Data

May 28, 2007 (KR) .................... 10-2007-0051544

(51) Int. Cl.
*G02F 1/1333* (2006.01)
(52) U.S. Cl. .................... 349/58; 362/632; 362/633; 362/634
(58) Field of Classification Search ............ 349/58–60; 352/632–634; 362/632–634
See application file for complete search history.

(56) References Cited

U.S. PATENT DOCUMENTS

| 2004/0090567 A1* | 5/2004 | Lee et al. .................... 349/58 |
| 2005/0280750 A1 | 12/2005 | Cho et al. |
| 2007/0109462 A1* | 5/2007 | Lee et al. .................... 349/58 |
| 2007/0126335 A1* | 6/2007 | You et al. .................... 313/485 |

FOREIGN PATENT DOCUMENTS

| JP | 2004-104545 | 4/2004 |
| KR | 2000-0009873 | 2/2000 |
| KR | 10-2005-0121006 | 12/2005 |
| KR | 10-2006-0028625 | 3/2006 |
| KR | 10-2006-0085011 | 7/2006 |
| KR | 10-2007-0021073 | 2/2007 |
| KR | 10-2007-0044136 | 4/2007 |

OTHER PUBLICATIONS

Patent Abstracts of Japan, Publication No. 2004-104545, dated Apr. 2, 2004, in the name of Kazuhiro Takeuchi.
Korean Patent Abstracts, Publication No. 1020000009873 A, dated Feb. 15, 2000, in the name of Ik Hwan Lee.

(Continued)

*Primary Examiner*—John Heyman
(74) *Attorney, Agent, or Firm*—Christie, Parker & Hale, LLP (57) ABSTRACT

A liquid crystal display includes a liquid crystal display panel. A backlight unit has a light guide plate and light source positioned on a back surface of the liquid crystal display panel. The liquid crystal display panel and the backlight unit are assembled on a mold frame. A bezel formed in a frame shape covers the external sides of the mold frame.

19 Claims, 7 Drawing Sheets

OTHER PUBLICATIONS

Korean Patent Abstracts, Publication No. 1020050121006 A, dated Dec. 26, 2005, in the name of Jin Woo Cho et al.
Korean Patent Abstracts, Publication No. 1020060028625 A, dated Mar. 30, 2006, in the name of Dong Nyuck Park.
Korean Patent Abstracts, Publication No. 1020060085011 A, dated Jul. 26, 2006, in the name of Sang Hoon Park et al.
Korean Patent Abstracts, Publication No. 1020070021073 A, dated Feb. 22, 2007, in the name of Naohito Toyomaki.
Korean Patent Abstracts, Publication No. 1020070044136 A, dated Apr. 27, 2007, in the name of Kyoung Don Lee.

* cited by examiner

LIQUID CRYSTAL DISPLAY WITH BACKLIGHT UNIT, MOLD FRAME AND COVERLESS BEZEL IN A FRAME SHAPE SURROUNDING AND DIRECTLY CONTACTING OUTER SIDE SURFACE OF MOLD FRAME

CROSS-REFERENCE TO RELATED APPLICATIONS

This application claims priority to and the benefit of Korean Patent Application No. 10-2007-0051544 filed May 28, 2007, the entire content of which is incorporated herein by reference.

BACKGROUND OF THE INVENTION

1. Field of the Invention

The present invention relates to a liquid crystal display, more particularly, to a liquid crystal display which includes a bezel.

2. Description of the Related Art

A liquid crystal display is one of the flat panel displays that display images using a liquid crystal and has advantages in that it is thinner and lighter than other displays and it has a low driving voltage and low power consumption, thus being widely used throughout the industry.

The liquid crystal display includes a thin film transistor (TFT) substrate, a color filter substrate opposite to the TFT substrate, and a liquid crystal display panel disposed between the two substrates and composed of a liquid crystal that changes light transmittance based on electrical signals applied thereto.

Since the liquid crystal included in the liquid crystal display panel can not emit light by itself, the liquid crystal display panel needs a light source for supplying light having a brightness exceeding a predetermined level in order to display an image. A backlight unit (BLU) using a light emitting diode (LED) is currently used as the light source of the liquid crystal display panel.

A light guide plate, which concentrates light generated from an LED, and an optical sheet, which equalizes the light from a light guide plate and leads appropriate brightness by converting a light path, are stacked on the backlight unit in a top down method. Here, a liquid crystal display panel and a backlight unit are generally supported by a structure composed of a mold frame and a bezel.

The liquid crystal display panel and the backlight unit is assembled to a mold frame made of a resin material by a hook-type method and the like, and a bezel made of a metal covers the peripheral of the mold frame so as to maintain the strength of the mold frame.

Recently small-medium size display devices, such as mobile phones, portable multimedia players (PMPs) and digital cameras, are becoming small and light. Therefore, the liquid crystal display is also becoming small and light. Accordingly, parts for conventional liquid crystal display devices are getting slim.

The conventional liquid crystal display includes a bezel for strength improvement. However, when the thickness of the bezel is set below about 0.5 mm, it is vulnerable to external impact (for example, torsional strength) or vibration. And, if the bezel is transformed by external impact or vibration, the mold frame is also transformed and the backlight unit and the liquid crystal display panel assembled to the mold frame can be damaged.

SUMMARY OF THE INVENTION

In accordance with the present invention a liquid crystal display is provided having a bezel is formed in a frame shape to cover a mold frame, thereby improving strength.

In accordance with an exemplary embodiment the liquid crystal display includes a liquid crystal display panel. A backlight unit has a light source on the back side of the liquid crystal display panel. A light guide plate is between the liquid crystal display panel and the light source. A mold frame is provided to which the liquid crystal display panel and the backlight unit is assembled. A bezel formed in a frame shape covers an outer side surface of the mold frame.

The bezel may be coupled with the mold frame.

The thickness of the bezel may be about 0.5 mm to 3.0 mm, further improving strength.

A cross-section of the bezel may be substantially square shaped.

The mold frame may include a light source assembling portion having one side open for a light source to be assembled, and the bezel having a step portion formed to cover the light source assembling portion.

The mold frame may include a bottom portion to which the backlight unit and the liquid crystal display panel are stacked and a peripheral portion which is formed at the edge of the bottom portion other than at the light source assembling portion and covering sides of the liquid crystal display panel.

The thickness of the mold frame may be about 0.4 mm to 1 mm.

The bezel may further include an inserting groove from an inner side surface to an outer side surface.

The inserting groove may have a depth of about 0.3 mm to 1 mm. The mold frame includes a protrusion inserted into the inserting groove.

The bezel may include a lower reinforcement portion extending from a square-shaped body toward an outer periphery of the bezel.

The bezel may further include an inserting groove extending from an inner side surface toward an outer side surface of the bezel.

The mold frame may include a protrusion inserted into the inserting groove.

The bezel may further include an upper reinforcement portion extending from an upper part of the body toward the outer periphery of the bezel.

The bezel may include first and second lower reinforcement portions and first and second upper reinforcement portions protruding toward the outer periphery of the bezel.

The first lower reinforcement portion and the first upper reinforcement portion may be formed on an outer side surface of the body, and the second lower reinforcement portion and the second upper reinforcement portion may be formed on an inner side surface of the body.

The mold frame may be stepped so that the outer side surface of the mold frame corresponds to the inner side surface of the bezel.

The backlight unit may further include a printed circuit board electrically coupling the light source and the liquid crystal display panel; a reflector sheet arranged on a back surface of the light guide plate; an optical sheet arranged between the light guide plate and the liquid crystal display panel; and a shielding tape disposed between the optical sheet and the liquid crystal display panel.

The light source is a light emitting diode.

DETAILED DESCRIPTION

Figure 1:
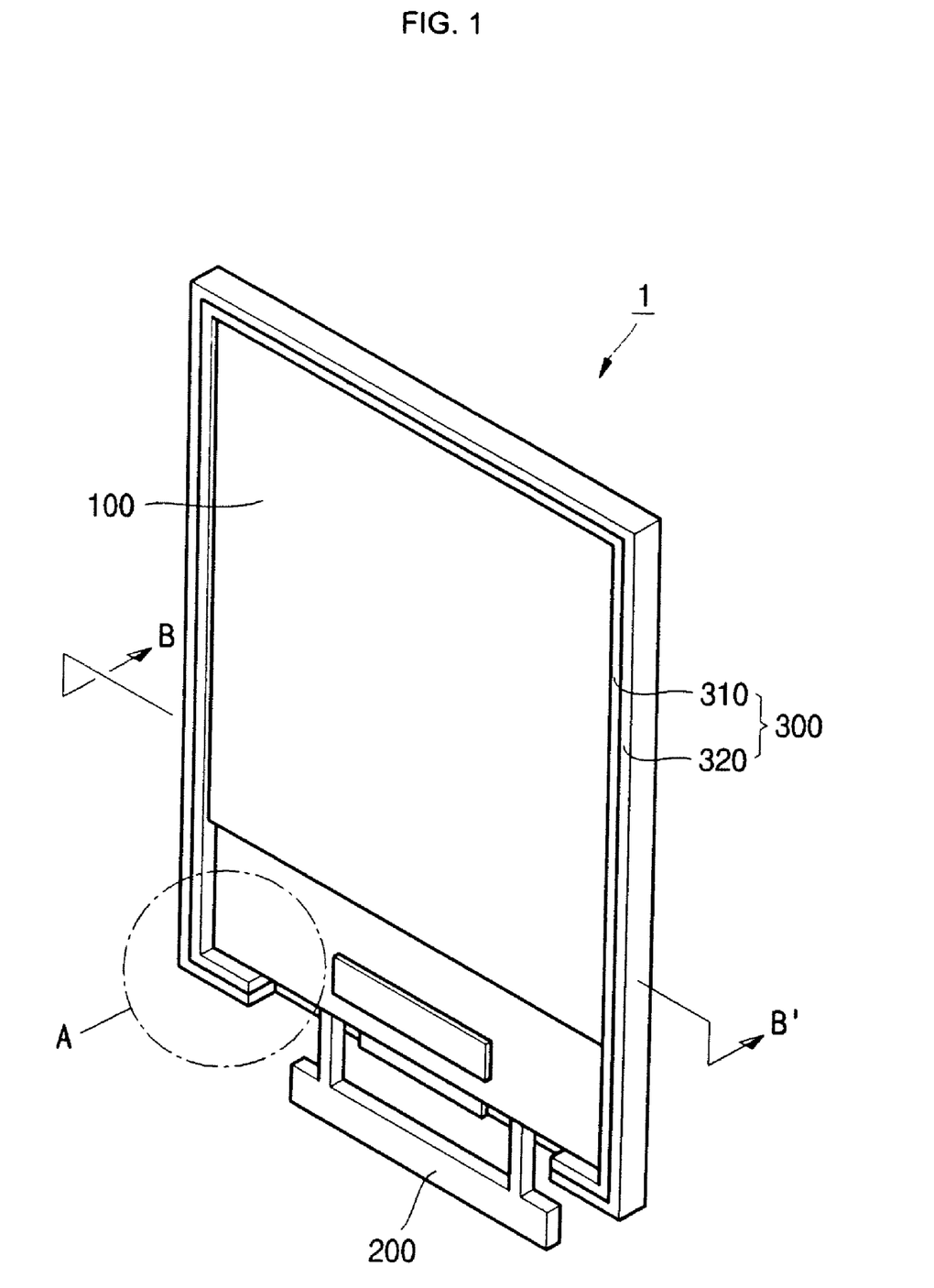
FIG. 1 shows an assembled liquid crystal display according to one exemplary embodiment of the present invention.
Figure 2:
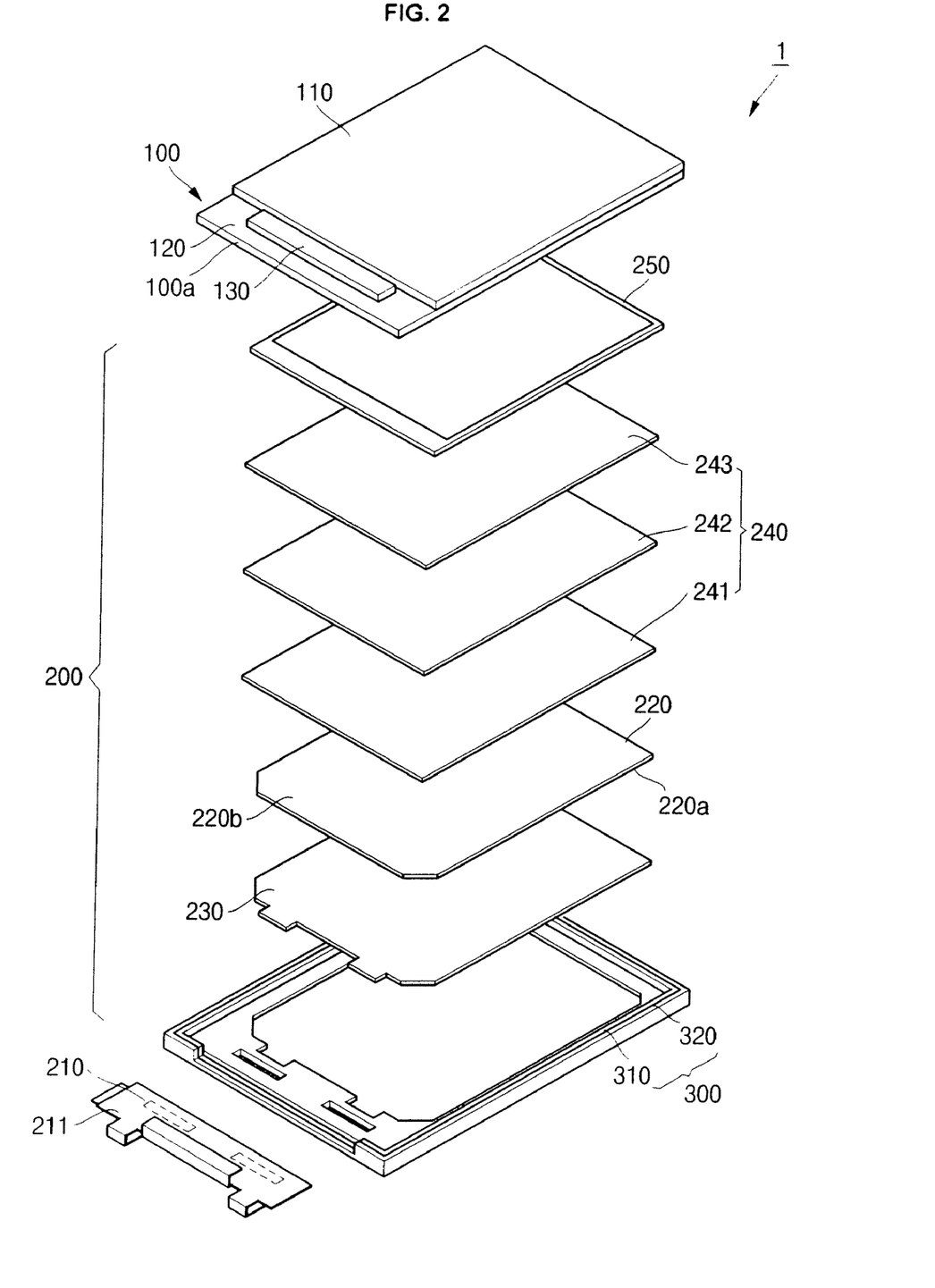
FIG. 2 is an exploded perspective view of FIG. 1.

Referring to FIG. 1 and to FIG. 2, a liquid crystal display 1 according to one exemplary embodiment of the present invention includes a liquid crystal display panel 100, a backlight unit 200, and a frame structure 300. The frame structure 300 may be composed of a mold frame 310 and a bezel 320. The bezel 320 which is formed in a frame shape to cover a mold frame 310 is inserted into the mold frame 310 so as to be integrally formed with the mold frame 310.

Between two opposing substrates, an upper substrate 110 and a lower substrate 120, the liquid crystal display panel 100 forms a liquid crystal (not shown) and an electrode (not shown) for driving a liquid crystal and includes a polarizing plate (not shown) which is arranged at least one surface of the two substrates. Here, a driver IC 130 for driving the liquid crystal display panel 100 is mounted on one side of a lower substrate 120. The liquid crystal display panel 100 displays information according to a liquid crystal driving. Such a liquid crystal display panel 100 may be assembled with a frame structure 300 which will be explained below. The structure of a liquid crystal display panel 100 is not limited to the present invention and the more detailed structure will be omitted as it may be seen by those having ordinary skill in the art.

The backlight unit 200 may be formed on a back surface 100a of a liquid crystal display panel 100. The backlight unit 200 may have a structure to provide light for displaying information on the liquid crystal display panel 100. More specifically, the backlight unit 200 includes a light source 210, a light guide plate 220, a reflector sheet 230, and an optical sheet 240.

The light source 210 is arranged on the back of the liquid crystal display panel 100 and is mounted on a printed circuit board 211 so as to be electrically coupled to the liquid crystal display panel 100. An LED may be used as the light source 210 which provides light to the liquid crystal display panel 100 to display information. The printed circuit board 211 coupled to the light source 210 may be formed of a soft material to be easily assembled in the liquid crystal display 1, and a plurality of driving ICs (not shown) may be further mounted for driving light source 210.

The light guide plate 220 is disposed between the light source 210 and the liquid crystal display panel 100 in order to convert a point light source provided from the light source 210 to a surface light source. Light from the light source 100 diffuses toward the liquid crystal display panel 100 by passing through a pattern (not shown) formed on the back surface 220a of the light guide plate 220. Since the light guide plate 220 is of high strength, it may not be transformed or damaged. The light guide plate 220 may be formed of a material, for example a poly methyl meta acrylate which transmits light well. The light guide plate 220 is assembled and fixed to a frame structure 300 which will be described below. A reflector sheet 230 may be arranged on the back surface 220a of the light guide plate 220 for preventing leakage of light to the back surface 220a of the light guide plate 220. A variety of optical sheets 240 may be arranged on the front surface 220b of the light guide plate 220 in order to improve the efficiency of light transmitting to the light crystal display panel 100.

The reflector sheet 230 is disposed on the back surface 220a of the light guide plate 220 to be placed in a frame structure 300, more specifically in a mold frame 310. As described above, the reflector sheet 230 transmits light, which may be discharged to a back surface 100a of the liquid crystal display panel 100, to the light guide plate 220. The material of the reflector sheet 230 may be polyethylene terephthalate (PET) or polycarbonate (PC), but it is not limited in the present invention, and it could be replaced with other materials having high reflexibility.

The optical sheet 240 includes a diffuser sheet 241 and a prism sheet 242 at the upper part of the light guide plate 220. The diffuser sheet 241 disperses light from the light guide plate 200 so that the light is to be equally transmitted to the liquid crystal display panel 100. The prism sheet 242 condenses light, which is dispersed by a light guide plate 220 and the diffuser sheet 241, to the liquid crystal display panel 100, thereby increasing light brightness. The backlight unit 200 may further include a protect sheet 243 to protect the optical sheet 240 from being damaged by an external impact or impurities.

The backlight unit 200 may further include a shielding tape 250 to prevent leakage of light to the portion of the liquid crystal display panel 100 in which information is not displayed. The shielding tape 250 is disposed between the optical sheet 240 and the liquid crystal display panel 100, and is mainly attached to the edge of the liquid crystal display panel 100 in which information is not displayed.

The frame structure 300 may be composed of the mold frame 310 to which the light source 210 and the light guide plate 220 are inserted and a bezel 320 which is inserted onto the mold frame 310 in order to support the mold frame 310. The bezel 320 is formed in a frame shape having square-shaped sections and is inserted onto the mold frame 310 to cover the mold frame 310. The frame structure 300 provides a space for the liquid crystal display panel 100 and the backlight unit 200 to be assembled into it. And, the frame structure 300 supports the liquid crystal display panel 100 and the backlight unit 200 and reinforces strength so that it protects the liquid crystal display 1 from being damaged by external impact or vibration. Below, the frame structure 300 will be explained in more detail according to one exemplary embodiment of the present invention.

Figure 3:
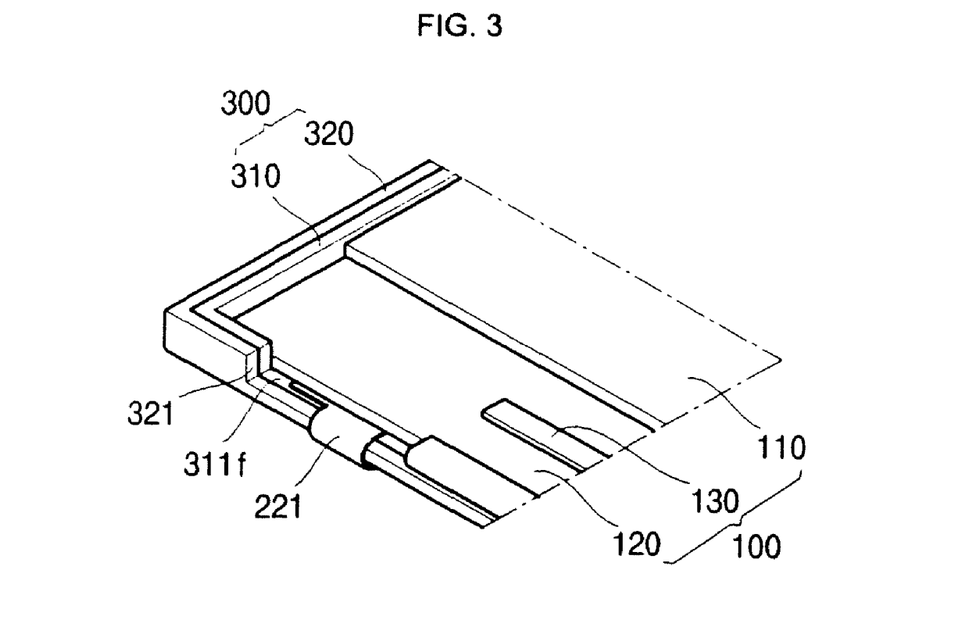
FIG. 3 is a partial perspective view illustrating "A" of FIG. 1.
Figure 4:
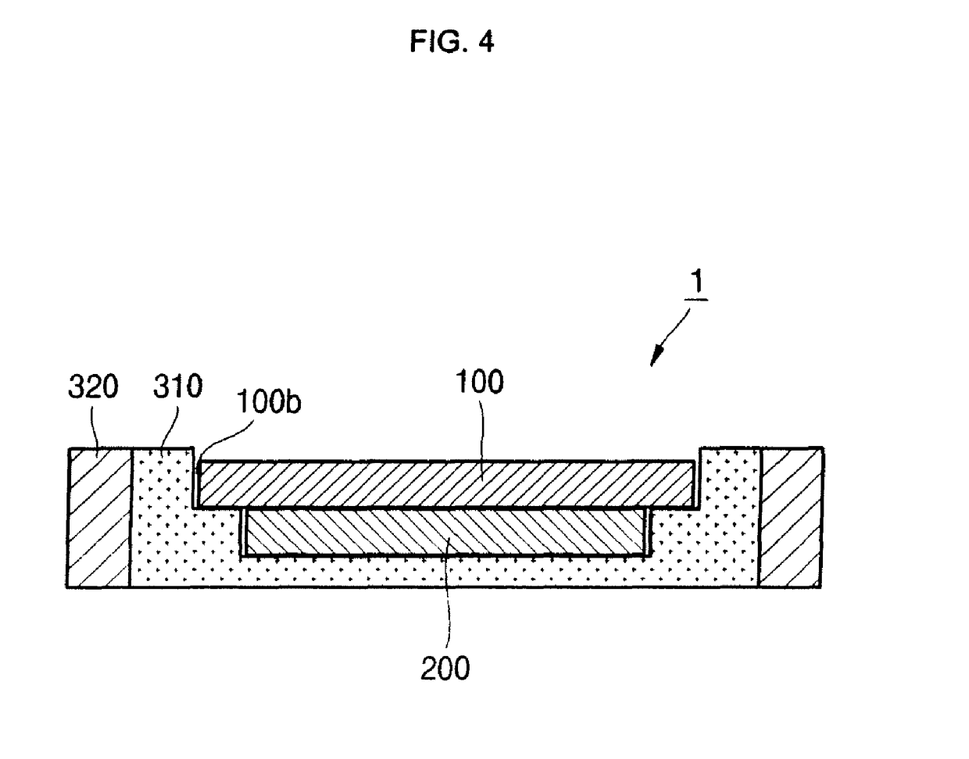
FIG. 4 is a cross-sectional view taken along the line B-B' of FIG. 1.
Figure 5:
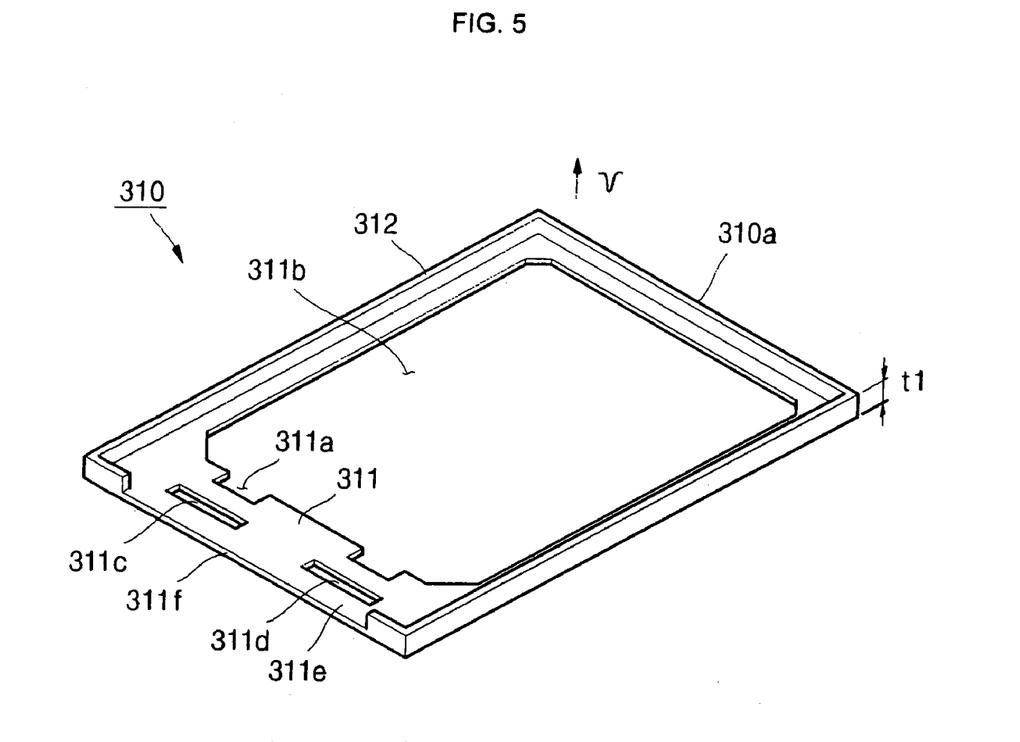
FIG. 5 is a perspective view of a mold frame according to one exemplary embodiment of the present invention.
Figure 6:
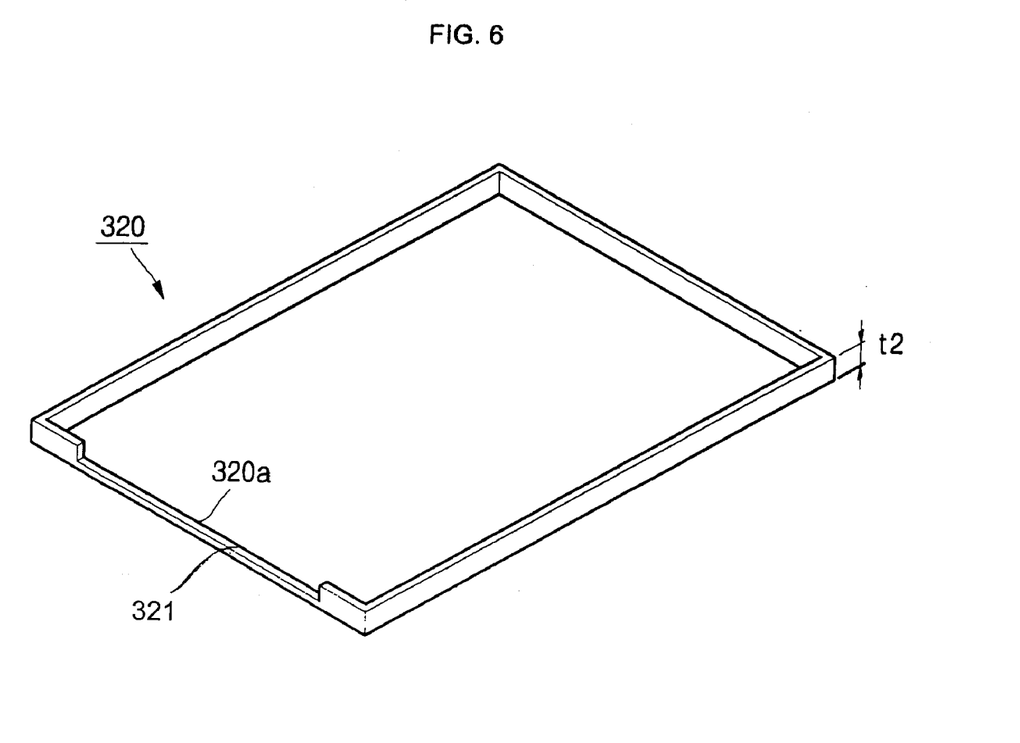
FIG. 6 is a perspective view of a bezel according to one exemplary embodiment of the present invention.

FIG. 3 is a partial perspective view illustrating portion "A" of FIG. 1 and FIG. 4 is a cross-sectional view taken along the line B-B' of FIG. 1. FIG. 5 is a perspective view of a mold frame according to one exemplary embodiment of the present invention and FIG. 6 is a perspective view of a bezel according to one exemplary embodiment of the present invention.

Referring to FIG. 3 to FIG. 6, the frame structure 300 according to one exemplary embodiment of the present invention includes the mold frame 310 to which the liquid crystal display panel 100 and the backlight unit 200 are assembled and a bezel 320 in a frame shape covering an outer side surface 310a of the mold frame 310.

The mold frame 310 includes a bottom portion 311 to which the backlight unit 200 and the liquid crystal display panel 100 are staked and assembled in sequence and a peripheral portion 312 at the edge of the bottom portion 311 to cover the liquid crystal display panel 100. The bottom portion 311 includes a light source fixing part 311a at which the light source 210 is fixed and a light guide plate fixing part 311b at which the light guide plate 220 is fixed. The bottom portion 311 may further include driving chip fixing parts 311c, 311d at which a plurality of driving IC (not shown) is fixed. Here, the driving chip is mounted on the printed circuit board 211, as seen in FIG. 2, for driving a light source 210. The light source fixing part 311a, the light guide plate fixing part 311b, and driving chip fixing parts 311c, 311d may be formed in a groove shape to receive respectively the light source 210, the light guide plate 220, and a plurality of driving ICs (not shown). The peripheral portion 312 may be bent from the bottom portion 311 to the upper vertical direction (v direction). The peripheral portion 312 may cover a side 100b of the liquid crystal display panel 100 which meets an upper surface 311e of the bottom portion 311. The mold frame 310 may have peripheral portion 312 formed on the area of the bottom portion 311 excluding at least one side surface 311f at which the light source 210 is assembled. Therefore, the mold frame 310 may be easily assembled with the light source 210 mounted on the printed circuit board 211. Below, there will be an explanation of the one side surface 311f having no peripheral portion 312 which may be deemed a light source assembling part.

The mold frame 310 may be formed of a synthetic resin material and the thickness t1 of the mold frame 310 may be about 0.4 mm to 1.0 mm. If the thickness t1 of the mold frame 310 is below 0.4 mm, the mold frame 310 may not support the structure of which the liquid crystal display panel 100, the backlight unit 200, the light source 210, and the light guide plate 200 are assembled. On the other hand, if the thickness t1 of the mold frame 310 is above 1.0 mm, the size and mass of the liquid crystal display 1 increase which means it would not be applicable to a small-medium size liquid crystal display. Such a mold frame 310 may be integrally formed with a bezel 320 in an injection molding process. More specifically, the bezel 320 is formed in an injection molding process to be inserted onto the mold frame 310. The mold frame 310 is one example of an embodiment of the present invention. It may be also formed in other shapes.

The bezel 320 in a square-shaped frame may cover an outer side surface 310a of the mold frame 310. The bezel 320 is a frame having a predetermined thickness to cover the mold frame 310 and protect the mold frame 310 from being twisted or damaged by external impact or vibration. A cross-section of the bezel 320 may be a square shape. The bezel 320 includes a step portion 321 at which one side surface 320a corresponding to a light source assembling part of the mold frame 310 is stepped. The step portion 321 which is formed for the frame structure 300 and the backlight unit 200 assembled may cover the light source assembling part of the mold frame 310.

The thickness t2 of the bezel 320 may be about 0.5 mm to 3.0 mm. If the thickness t2 of the bezel 320 is below 0.5 mm, it may be transformed by external impact or vibration as the strength of the bezel 320 becomes weak. On the other hand, if the thickness t2 of the bezel 320 is above 3.0 mm, the size and mass of the liquid crystal display 1 increase which means it would not be applicable to a small-medium size liquid crystal display.

The bezel 320 may be formed of a metal material, for example any one selected from a group of Al and Ag. But the material is so not limited in accordance with the present invention. Other materials of light weight and high strength may be used for a small-medium size liquid crystal display. The bezel 320 may be formed by press processing. For example, the bezel 320 may be formed of a metal plate or steel which are bent by the press. Here, a step portion 321 may be formed by milling processing which cuts one side surface 320a of the bezel 320 in a frame shape. However, the forming method of the bezel 320 is not so limited in accordance with the present invention.

According to one exemplary embodiment of the present invention described above, since the bezel 320 being inserted onto the mold frame 310 becomes thick, the strength of the liquid crystal display 1 improves. The strength of the bezel 320 according to the present invention improves about 1.8 times than that of the conventional slim bezel. Here, the strength of the bezel 320 varies according to the kind of a liquid crystal display.

Figure 7:
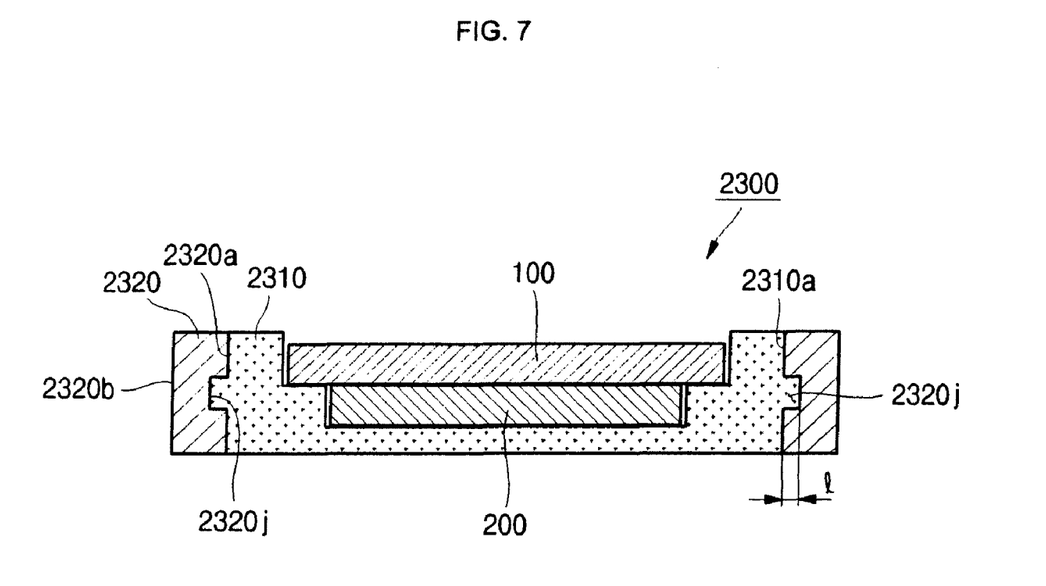
FIG. 7 is a sectional view of a frame structure corresponding to FIG. 4 according to another exemplary embodiment of the present invention.

FIG. 7 is a sectional view of a frame structure corresponding to FIG. 4 according to another exemplary embodiment of the present invention.

Referring to FIG. 7, a frame structure 2300 includes a mold frame 2310 to which a liquid crystal display panel 100 and a backlight unit 200 are assembled. A bezel 2320 in a frame shape covers an outer side surface 2310a of the mold frame 2310.

The bezel 2320 may further include an inserting groove 2320j which is dug out from an inner side surface 2320a toward an outer side surface 2320b. The mold frame 2310 includes a protrusion 2310j for insertion into the inserting groove 2320j. The inserting groove 2320j may be dug out as much as about 0.3 mm to 1 mm in order to improve the strength after inserted into the mold frame 2310. This is one third of the thickness of the bezel 2320. For example, the inserting groove 2320j may be 0.3 mm in length for the bezel 2320 of 1 mm thickness. If the length l of the inserting groove 2320j becomes less than 0.3 mm, the strength may rarely improve. On the other hand, if the length of l becomes greater than 1 mm, the horizontal width of the bezel 2320 is reduced, thereby possibly weakening the strength.

The inserting groove 2320j may be formed partially on an inner side surface 2320a of the bezel 2320. Since other parts of the bezel 2320 except for the inserting groove 2320j are same as the bezel 320 as previously described, a further detailed explanation will be omitted.

Figure 8:
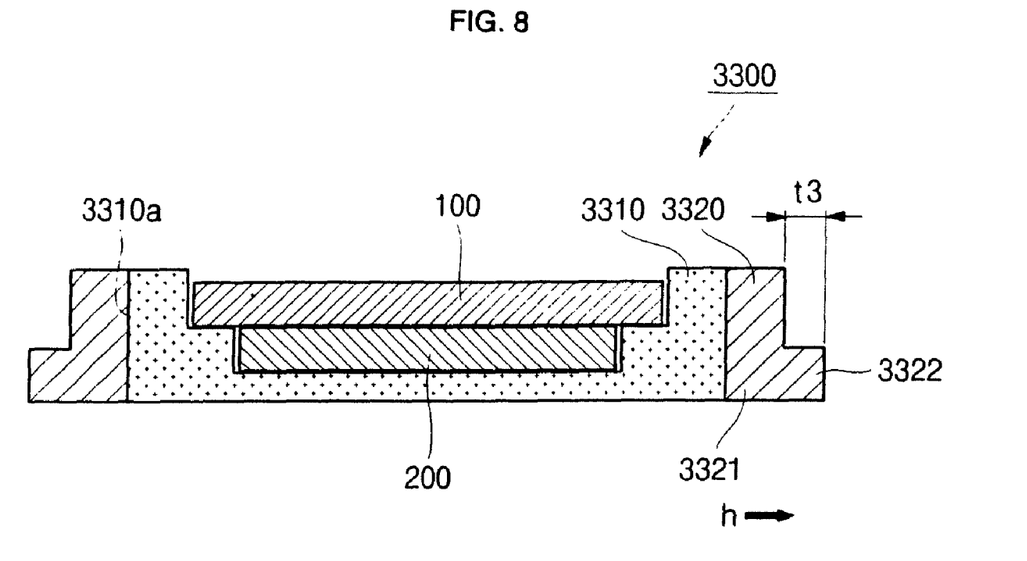
FIG. 8 is a sectional view of a frame structure corresponding to FIG. 4 according to another exemplary embodiment of the present invention.

FIG. 8 is a sectional view of a frame structure corresponding to FIG. 4 according to another exemplary embodiment of the present invention.

Referring to FIG. 8, a frame structure 3300 includes a mold frame 3310 to which a liquid crystal display panel 100 and a backlight unit 200 are assembled. A bezel 3320 in a frame shape covers an outer side surface 3310a of the mold frame 3310.

The bezel 3320 includes a body 3321 and a reinforcement portion 3322 for providing strength particularly torsional strength. The reinforcement portion 3322 may be bent from a lower part of the body 3321 in an outer horizontal direction h. The reinforcement portion 3322 may have a thickness t3 of approximately below 2.0 mm considering the size of a liquid crystal display. However the thickness t3 of the reinforcement portion 3322 is not so limited in accordance with the present invention. The cross-section of the reinforcement portion 3322 of the bezel 3320 results in an approximately 'L' shape. Though it is not illustrated in FIG. 8, the bezel 3320 may have an inserting groove, similar to inserting groove 2320j shown FIG. 7, for further improving the strength.

Figure 9:
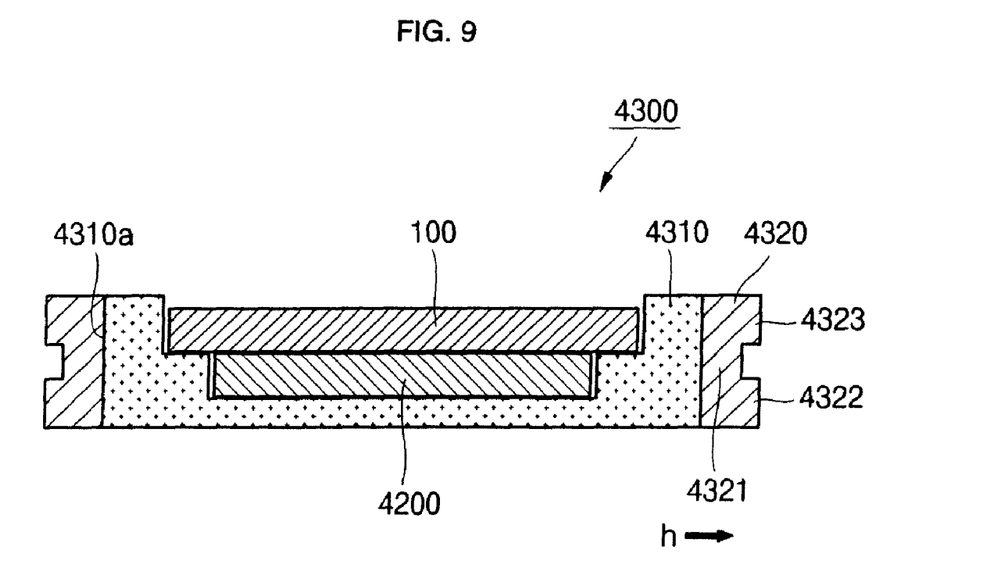
FIG. 9 is a sectional view of a frame structure corresponding to FIG. 4 according to another exemplary embodiment of the present invention.

FIG. 9 is a sectional view of a frame structure corresponding to FIG. 4 according to still another exemplary embodiment of the present invention.

Referring to FIG. 9, a frame structure 4300 includes a mold frame 4310 to which a liquid crystal display panel 100 and a backlight unit 200 are assembled. A bezel 4320 in a frame shape covers an outer side surface 4310a of the mold frame 4310. The bezel 4320 includes a body 4321, a lower reinforcement portion 4322 which may be bent from a lower part of the body 4321 to an outer horizontal direction h, and an upper reinforcement portion 4323 which may be bent from an upper part of the body 4321 to the outer horizontal direction h. Accordingly, the cross-section of the bezel 4320 may be approximately U-shaped. Though not illustrated in FIG. 10, the bezel 4320 may have an inserting groove similar to inserting groove 2320j shown in FIG. 7, for further improving strength. Since the bezel 4320 according to the present embodiment of the present invention has the same effect and function as the previous embodiments, a further detailed explanation will be omitted.

Figure 10:
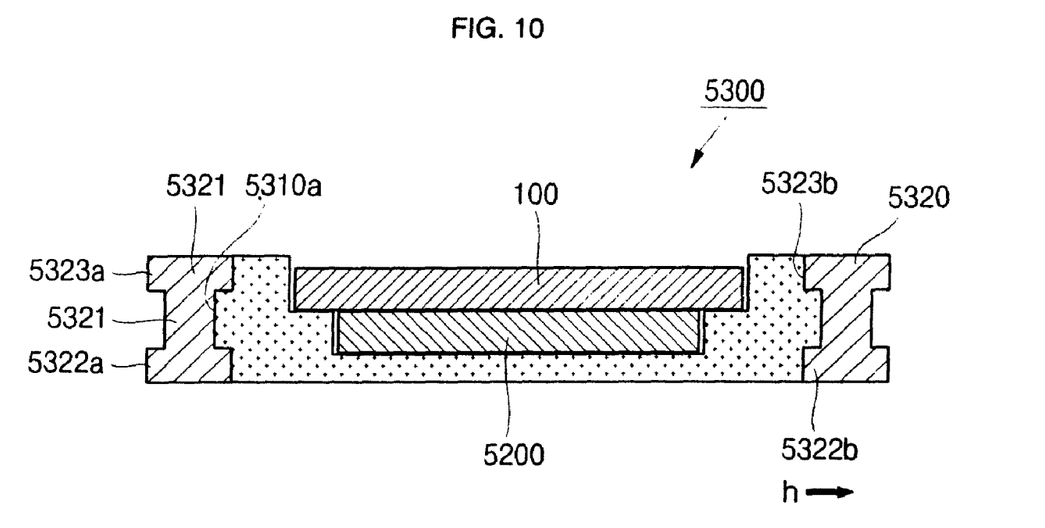
FIG. 10 is a sectional view of a frame structure corresponding to FIG. 4 according to another exemplary embodiment of the present invention.

FIG. 10 is a sectional view of a frame structure corresponding to FIG. 4 according to another exemplary embodiment of the present invention.

Referring to FIG. 10, a frame structure 5300 includes a mold frame 5310 to which a liquid crystal display panel 100 and a backlight unit 200 are assembled. A bezel 5320 in a frame shape covers an outer side surface 5310a of the mold frame 5310.

The bezel 5320 includes a body 5321 in a square shape, first and second lower reinforcement portions 5322a, 5322b and first and second upper reinforcement portions 5323a, 5323b which protrude from lower and upper parts of the body 5321 to both horizontal directions h respectively. The first lower reinforcement portion 5322a and the first upper reinforcement portion 5323b may be formed on an outer side surface 5320a of the body 5321, and the second lower reinforcement portion 5323a and the second upper reinforcement portion 5323b may be formed on an inner side surface 5320b of the body 5321. Accordingly, the cross-section of the bezel 5320 may be approximately H-shaped. The bezel 5320 may be formed by cutting both sides of the body 5321 by milling processing. The outer side surface 5310a of the mold frame 5310 has a shape corresponding to the inner side surface 5320a of the bezel 5320 including the second lower reinforcement portion 5322a and the second upper reinforcement portion 5323b. According to the present embodiment the mold frame 5310 is between the second lower reinforcement portion 5323a and the second upper reinforcement portion 5323b which are formed on the inner side surface 5320b of the body 5321, thereby improving strength more. The bezel 5320 according to the present embodiment has an advantage such that the inserting groove 2320j shown in FIG. 7 does not have to be additionally formed. Since the basic effect and function is same as the previous embodiments in accordance with the present invention, a further detailed explanation will be omitted.

Although exemplary embodiments of the organic light emitting display of the present invention have been described for illustrative purpose, those skilled in the art will appreciate that various modifications and changes thereof are possible without departing from the scope and spirit of the present invention, and all modifications and changes are intended to be included within the description of the claims.

What is claimed is:

1. A liquid crystal display, comprising:
   a liquid crystal display panel;
   a backlight unit comprising:
   a light source on a back side of the liquid crystal display panel, and
   a light guide plate between the liquid crystal display panel and the light source;
   a mold frame to which the liquid crystal display panel and the backlight unit are assembled, the mold frame having an outer side surface; and
   a coverless bezel in a frame shape surrounding and directly contacting the outer side surface, the bezel defining a through-opening sized to fit the mold frame therewithin.

2. The liquid crystal display as claimed in claim 1, wherein the bezel is coupled to the mold frame.

3. The liquid crystal display as claimed in claim 1, wherein the bezel has a thickness of about 0.5 mm to 3.0 mm.

4. The liquid crystal display as claimed in claim 3, wherein a cross-section of the bezel is substantially rectangular shaped.

5. The liquid crystal display as claimed in claim 4,
   wherein the mold frame comprises a light source assembling portion having one side open for assembling the light source, and
   wherein the bezel comprises a step portion at which one side surface is stepped to cover the light source assembling portion.

6. The liquid crystal display as claimed in claim 5, wherein the mold frame further comprises;
   a bottom portion to which the backlight unit and the liquid crystal display panel are stacked; and
   a peripheral portion at the edge of the bottom portion other than at the light source assembling portion and covering sides of the liquid crystal display panel.

7. The liquid crystal display as claimed in claim 6, wherein the mold frame has a thickness of about 0.4 mm to 1 mm.

8. The liquid crystal display as claimed in claim 1, wherein the bezel comprises:
   a body in a rectangular shape; and
   a lower reinforcement portion extending from a lower part of the body toward an outer periphery of the bezel.

9. The liquid crystal display as claimed in claim 8, wherein the bezel further comprises an inserting groove extending from an inner side surface of the bezel toward an outer side surface of the bezel.

10. The liquid crystal display as claimed in claim 9, wherein the mold frame comprises a protrusion coupled with the inserting groove.

11. The liquid crystal display as claimed in claim 8, wherein the bezel further comprises an upper reinforcement portion extending from an upper part of the body toward the outer periphery of the bezel.

12. The liquid crystal display as claimed in claim 1, wherein the bezel comprises:
   a body in a rectangular shape; and
   a first lower reinforcement portion, a second lower reinforcement portion, a first upper reinforcement portion and a second upper reinforcement portion, each portion protruding from the body toward an inner or outer periphery of the bezel.

13. The liquid crystal display as claimed in claim 12, wherein the first lower reinforcement portion and the first upper reinforcement portion are on an outer side surface of the body, and
wherein the second lower reinforcement portion and the second upper reinforcement portion are on an inner side surface of the body.

14. The liquid crystal display as claimed in claim 12, wherein an outer side surface of the mold frame is stepped to correspond with an inner side surface of the bezel.

15. The liquid crystal display as claimed in claim 1, wherein the backlight unit further comprises:
a printed circuit board electrically coupling the light source and the liquid crystal display panel;
a reflector sheet on a back surface of the light guide plate and on the mold frame;
an optical sheet between the light guide plate and the liquid crystal display panel; and
a shielding tape between the optical sheet and the liquid crystal display panel.

16. The liquid crystal display as claimed in claim 15, wherein the light source is a light emitting diode.

17. A liquid crystal display, comprising:
a liquid crystal display panel;
a backlight unit comprising:
a light source on a back side of the liquid crystal display panel, and
a light guide plate between the liquid crystal display panel and the light source;
a mold frame to which the liquid crystal display panel and the backlight unit are assembled, the mold frame having an outer side surface; and
a coverless bezel in a frame shape surrounding and directly contacting the outer side surface,
wherein the bezel has a thickness of about 0.5 m to 3.0 mm,
wherein a cross-section of the bezel is substantially rectangular shaped,
wherein the mold frame comprises a light source assembling portion having one side open for assembling the light source,
wherein the bezel comprises a step portion at which one side surface is stepped to cover the light source assembling portion,
wherein the mold frame further comprises:
a bottom portion to which the backlight unit and the liquid crystal display panel are stacked; and
a peripheral portion at the edge of the bottom portion other than at the light source assembling portion and covering sides of the liquid crystal display panel,
wherein the mold frame has a thickness of about 0.4 m to 1 mm, and
wherein the bezel further comprises an inserting groove from an inner side surface of the bezel toward an outer side surface of the bezel.

18. The liquid crystal display as claimed in claim 17, wherein the inserting groove has a depth of about 0.3 mm to 1 mm.

19. The liquid crystal display as claimed in claim 17, wherein the mold frame comprises a protrusion for coupling with the inserting groove.

* * * * *

UNITED STATES PATENT AND TRADEMARK OFFICE
CERTIFICATE OF CORRECTION

Page 1 of 1

PATENT NO. : 7,839,465 B2
APPLICATION NO. : 12/051760
DATED : November 23, 2010
INVENTOR(S) : Younhwan Jung et al.

It is certified that error appears in the above-identified patent and that said Letters Patent is hereby corrected as shown below:

In the Claims

Column 10, Claim 17, line 3    Delete "0.5m"
                                Insert -- 0.5mm --

Column 10, Claim 17, line 19   Delete "0.4m"
                                Insert -- 0.4mm --

Signed and Sealed this
Sixth Day of March, 2012

David J. Kappos
*Director of the United States Patent and Trademark Office*